United States Patent
Mollie et al.

(10) Patent No.: US 7,280,745 B2
(45) Date of Patent: Oct. 9, 2007

(54) PROCESS AND DEVICE FOR MANAGING THE MEMORY SPACE OF A HARD DISK, IN PARTICULAR FOR A RECEIVER OF SATELLITE DIGITAL TELEVISION SIGNALS

(75) Inventors: Gilles Mollie, Bresson (FR); Vincent de Schuyteneer, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 1115 days.

(21) Appl. No.: 10/172,356

(22) Filed: Jun. 14, 2002

(65) Prior Publication Data
US 2003/0002864 A1    Jan. 2, 2003

(30) Foreign Application Priority Data
Jun. 15, 2001    (FR) .................................. 01 07825

(51) Int. Cl.
*H04N 5/781*    (2006.01)
(52) U.S. Cl. .................... 386/125; 386/46; 386/126
(58) Field of Classification Search ................ 386/45, 386/70, 82, 105, 106, 125, 126, 46; 725/92, 725/115, 145; 369/47.34, 59.26; 711/105, 711/157, 173
See application file for complete search history.

(56) References Cited

U.S. PATENT DOCUMENTS

| | | | | |
|---|---|---|---|---|
| 5,835,669 A | * | 11/1998 | Hirayama et al. | 386/125 |
| 5,956,745 A | * | 9/1999 | Bradford et al. | 711/137 |
| 6,018,775 A | | 1/2000 | Vossler | |
| 6,181,867 B1 | * | 1/2001 | Kenner et al. | 386/46 |
| 6,658,439 B2 | * | 12/2003 | Karasudani | 386/95 |
| 6,907,184 B1 | * | 6/2005 | Yokota et al. | 386/125 |

FOREIGN PATENT DOCUMENTS

| | | |
|---|---|---|
| EP | 0971358 | 1/2000 |
| EP | 0984352 | 3/2000 |

* cited by examiner

*Primary Examiner*—John Miller
*Assistant Examiner*—Christopher Onuaku
(74) *Attorney, Agent, or Firm*—Lisa K. Jorgenson; Allen, Dyer, Doppelt, Milbrath & Gilchrist, P.A.

(57) ABSTRACT

Several audio/video streams are recorded in an interleaved manner on logical tracks of variable sizes. These audio/video streams are selected on the basis of an allocation table contained in a random access memory, and which describes the state of occupancy of the logical tracks. The logical tracks include elementary storage portions formed of integer numbers of sectors of the disk. A chaining of the various portions is performed during recording using the index numbers of the preceding and succeeding portions, as well as indications of unknown relationships which will be updated subsequently.

34 Claims, 4 Drawing Sheets

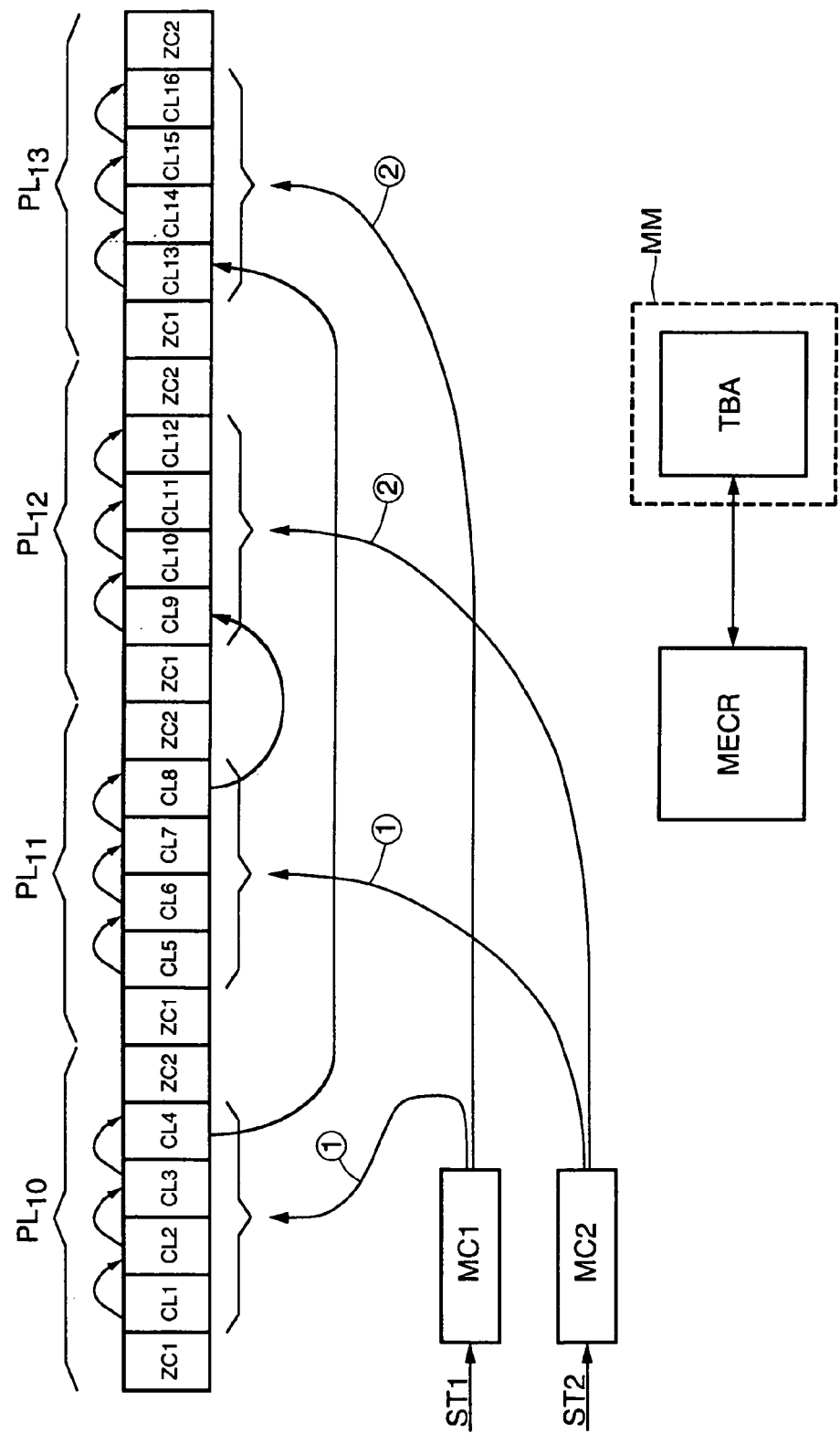

PROCESS AND DEVICE FOR MANAGING THE MEMORY SPACE OF A HARD DISK, IN PARTICULAR FOR A RECEIVER OF SATELLITE DIGITAL TELEVISION SIGNALS

FIELD OF THE INVENTION

The present invention relates to the management of memory space on a hard disk, and in particular, to a hard disk for storing audio/video streams, such as those received by a digital television satellite receiver, for example.

BACKGROUND OF THE INVENTION

In digital video, the requirement for the storage of audio/video data is considerable. Hence, a hard disk is preferably used to store the recordings. A hard disk is an element which exhibits a very good storage quantity/price ratio. At present, the file operating systems which manage the memory space of hard disks have been developed for work stations, that is, they are dedicated to a pure computing application.

To store video, provisions are then made to allocate specific resources (fixed spaces) on the hard disk in the form of several independent blocks making it possible to store and/or to read out several audio/video data streams. Such an organization has drawbacks. Specifically, if one wishes to record several video data streams simultaneously, one must do so in distinct independent blocks, thus making it necessary to perform to and from displacements between the independent blocks. These to and from displacements are manifested as frequent displacements of the reading/recording head of the disk.

Also, during these displacements, no activity is possible on the disk. This reduces the possible bit rate of recording, and reduces the performance of the disk since the bandwidth decreases. The same problem arises when one wishes to simultaneously record and read video data streams in and on the basis of independent blocks.

SUMMARY OF THE INVENTION

In view of the foregoing background, an objective of the present invention is to limit the displacement of the disk head, and in particular, during the simultaneous recording of several audio/video data streams, and also during the recording of several audio/video streams and the simultaneous reading of another video stream already recorded on the disk.

Another object of the present invention is to provide a good robustness with regards to the detection of losses of the supply of the device incorporating the hard disk.

These and other objects advantages and features in accordance with the present invention are provided by a process for managing the memory space of a hard disk incorporated into a computing device, such as a digital television satellite receiver, for example, and the computing device comprises a random access memory (RAM) for receiving several audio/video data streams.

According to one mode of implementation, the process comprises, in particular, a formatting phase in which at least a part of the memory space of the hard disk is divided into a useful space and a control space. The useful space is subdivided into several adjacent areas, each composed of contiguous logical tracks of equal storage capacity.

The logical tracks are different from the physical tracks actually existing on the hard disk. Specifically, neither the actual number of areas of a hard disk nor the number of physical tracks are generally known. The invention therefore makes provision, in the formatting phase, to partition the memory space of the hard disk or at the very least a part of this memory space, into a set of contiguous logical tracks which will resemble the actual tracks, but which will offer the most constant possible reading or writing times for all the logical tracks. This is why, according to the invention, the logical tracks are of variable size.

More precisely, the values of the respective storage capacities of the logical tracks decrease continuously from a maximum value corresponding to the storage capacity of the logical tracks of the area at the periphery of the disk, down to a minimum value corresponding to the storage capacity of the logical tracks of the area at the center of the disk. The ratio of the minimum value (minimum size of a logical track) to the maximum value (maximum size of a logical track) corresponds to the ratio of the size of a physical track at the center of the disk to that of a track at the periphery of the disk.

As will be seen in greater detail below, a logical track is an atomic element for access to audio/video information. Also, as will be seen in greater detail below, the process according to the invention uses, for example, cache memories to store on-the-fly the various audio/video streams received. Hence, one approach for fixing the storage capacity of a logical track at the periphery of the disk, that is, a logical track which exhibits the largest storage capacity, includes rendering this storage capacity equal to that of the cache memory available.

The control space comprises, in particular, an allocation table containing indications regarding the state of occupancy of the logical tracks. Thus, by way of indication, a logical track can be declared completely free while exhibiting completely free neighbors. The track can also be declared partially occupied (by files or by directories, for example) or then be declared full, that is, for example, occupied completely by audio/video information.

In addition to the formatting phase, the process of the invention comprises, in particular, a duplication phase in which, during each deployment of the device, the content of the allocation table is duplicated from the control space into the random access memory.

According to one mode of implementation of the invention, the allocation table is in a file, called the persistent file, of the control space which comprises, in addition to this allocation table, the start address and the end address of each logical track or, as a variation, the address of the area and the number and the size of the tracks of the area. The size of the persistent file is particularly restricted relative to the size of the useful space of the hard disk.

Thus, by way of indication, the invention makes it possible to obtain a ratio of 1 byte in the persistent file for one 1 megabyte in the useful storage space of the disk. Such a ratio is therefore fully compatible with a duplication of the content of the allocation table from the control space (persistent file) in the random access memory.

The process according to the invention also comprises a writing phase in one mode of implementation of which during the reception of the audio/video data streams:

a) a completely free logical track is selected on the basis of the allocation table contained in the random access memory, preferably a completely free logical track at the start of a succession of a predetermined number of contiguous and completely free logical tracks, for example, 5 contiguous and completely free logical tracks;

b) the audio/video streams are stored on-the-fly in different cache memories, at the rate of one cache memory per stream;

c) when one of the cache memories comprises a data set whose size corresponds to the storage capacity of the selected logical track, the content of the cache memory is stored on the logical track and the content of the allocation table in the random access memory is updated;

d) the next completely free logical track which follows that previously selected is selected on the basis of the allocation table contained in the random access memory; and e) steps b) to d) are repeated until the reception of an end of a writing signal. This end of the writing signal can be a signal resulting from the user wanting to stop the recording of the audio/video transmission, or else a signal signifying the end of storage on the disk of all the video streams currently being recorded.

Moreover, the final logical track allocated to a stream may be only partially written by this stream. Specifically, if the last part of the stream to be stored has a smaller size than the logical track finally selected, this final part of the stream will occupy only a part of the logical track.

The process according to the invention also comprises a chaining phase in which a chain of relationships between the various logical tracks assigned to the same stream is formulated.

The process according to the invention also comprises an updating phase in which the content of the allocation table in the control space of the disk is updated on the basis of the allocation table contained in the random access memory. Stated otherwise, in this phase, the content of the allocation table is copied from the random access memory to that contained in the persistent file of the control space. This updating phase can be performed, for example, on completion of the writing on the disk of the entire audio/video stream files.

The process according to the invention thus makes it possible to record in an interleaved manner the various audio/video streams on logical tracks, and to do so by selecting logical tracks of the disk successively and in the same direction. This selection and this storage in the same direction is manifested by a displacement of the head of the disk always in the same direction without it being necessary to perform to and from displacements, with the objective of limiting the number of displacements of the write head. Additionally, selecting the logical tracks on the basis of the allocation table which has been duplicated in the random access memory also avoids the to and from displacements of the disk which would have been required if it had been necessary to select the tracks on the basis of the content of the allocation table contained in the persistent file situated in the control space of the disk.

According to one mode of implementation of the process according to the invention, on completion of the formatting phase, each logical track comprises a useful area subdivided into several adjacent elementary portions (or clusters), and a control area comprising for each elementary portion a first indication of relationship and a second indication of relationship. For simplification purposes, an elementary portion will in the subsequent description be referred to by the term cluster.

The chaining phase in which the chain of relationships between the various logical tracks assigned to the same stream is formulated then comprises, in such a mode of implementation, the updating, during the storage of the data set on a selected logical track, of the first indication of relationship of each elementary portion of the track, with a start of file indication or with the index number of the preceding elementary portion. Of course, the start of file indication will relate only to the first cluster of the first logical track selected receiving the first data of the stream.

The chaining phase also comprises the updating, during this storage of the data set on this selected logical track, of the second indication of relationship of each elementary portion of the track except for the last, with the index number of the next elementary portion or with an end of file indication or with a non-occupancy indication.

Specifically where an audio/video data set contained in a cache memory has a size equal to that of a completely free logical track, and when this set is transferred to the logical track, the relationship of each cluster of the logical track (except for the last) towards the next cluster of this same logical track is known. This second indication of relationship will then, for example, be the absolute index number of the cluster on the disk. When the data set which is transferred to the logical track is representative of the end of the stream, one of the clusters of the track may be the last one written. In this case, the second indication of relationship is an end of file indication. The two indications of relationships of the following clusters are then a non-occupancy indication.

The updating of the second indication of relationship of the last cluster of the track can also be performed where appropriate with an end of file indication or a non-occupancy indication. When the stream is still being recorded and when it is necessary to use other logical tracks to store it, one does not know a priori which index number of the next logical track will be selected, and when audio/video data are stored in the last cluster of the logical track. Under these conditions, the second indication of relationship of the last cluster of the logical track currently selected will be updated with an indication of an unknown relationship.

Also, the updating of all the unknown relationships will be performed subsequently, and always in such a way as to avoid the to and from displacements of the read head of the disk. This updating of unknown relationships can be performed, for example, on completion of a writing on the disk of the entire audio/video stream files. This is performed by backtracking through the logical tracks assigned to the same stream, and the clusters of these logical tracks using the first indications of relationships which contain the indications towards the preceding clusters.

This updating can also be performed possibly under time sharing with the writing of the streams on the disk, especially if the bit rate of the information received is compatible with an additional task such as this. To be more robust with regards to any writing errors, the control area of each logical track is advantageously formed of two identical parts respectively disposed at the two ends of the logical track.

According to one mode of implementation of the invention, the control space of the hard disk comprises a global dating word, while the control area of each logical track comprises a local dating word. In the duplication phase, the content of the global dating word is also copied into the random access memory. In the writing phase, the value of the global dating word contained in the random access memory is incremented with each write on the disk, and with each write to a logical track, the content of the global dating word is copied into the local dating word of the control area of the relevant logical track.

The comparison of the value of the global dating word with the values of the local dating words yields an indication regarding a possible earlier occurrence of a loss of supply of the device. Specifically, in the case of such a loss of supply, the global dating word contained in the random access memory will be cancelled out and will consequently become less than the values of certain local dating words, which represents an anomaly since the value of this global dating word must always be greater than the values of all the local dating words. Such a mode of implementation thus confers, in an especially simple manner, robustness of the device with regards to the detection of the losses of supply.

The subject of the invention is also a computing device comprising a random access memory able to receive several audio/video data streams, a hard disk and processing means (CPU) comprising, in one embodiment:

formatting means able to divide at least one part of the memory space of the disk into a useful space itself subdivided into several adjacent areas each containing several contiguous logical tracks all having the same storage capacity. The values of the respective storage capacities of the logical tracks decrease continuously from a maximum value corresponding to the storage capacity of the logical tracks of the area at the periphery of the disk, down to a minimum value corresponding to the storage capacity of the logical tracks of the area at the center of the disk. The ratio of the minimum value to the maximum value corresponds to the ratio of the size of a physical track at the center of the disk to that of a track situated at the periphery of the disk; and a control space comprising an allocation table containing indications regarding the state of occupancy of the logical tracks;

duplication means able during each deployment of the device, to duplicate the content of the allocation table from the control space into the random access memory;

writing means able during the reception of the video data streams;

f) to select on the basis of the allocation table contained in the random access memory, a completely free logical track;

g) to store respectively on-the-fly the streams in different cache memories;

h) when one of the cache memories comprises a data set whose size corresponds to the storage capacity of the selected logical track, to store the content of the cache memory on the logical track and to update the content of the allocation table in the random access memory;

i) to select on the basis of the allocation table, the next completely free logical track which follows that previously selected;

j) to re-execute the operations f) to i) until the reception of an end of writing signal. The final logical track is allocated to a stream possibly being only partially written by this stream;

chaining means able to formulate a chain of relationships between the various logical tracks assigned to the same stream; and updating means able to update the content of the allocation table in the control space of the disk on the basis of the allocation table contained in the random access memory.

According to one embodiment of the invention, the formatting means are able to split each logical track into a useful area subdivided into several adjacent elementary portions, and into a control area comprising for each elementary portion a first indication of relationship and a second indication of relationship. The chaining means are then able during the storage of a data set on a selected logical track;

to update the first indication of relationship of each elementary portion of the track, with a start of file indication or with the index number of the preceding elementary portion;

to update the second indication of relationship of each elementary portion of the track except for the last, with the index number of the next elementary portion or with an end of file indication, or with a non-occupancy indication;

to update the second indication of relationship of the last elementary portion of the track with an end of file indication or with an indication of unknown relationship or with a non-occupancy indication; and to update the unknown relationships subsequently.

The subject of the invention is also a receiver of satellite digital television signals including a device such as that defined above.

BRIEF DESCRIPTION OF THE DRAWINGS

Other advantages and characteristics of the invention will become apparent when examining the detailed description of a wholly non-limiting embodiment and mode of implementation, and the appended drawings in which:

FIG. 7 diagrammatically illustrates an implementation of the process according to the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
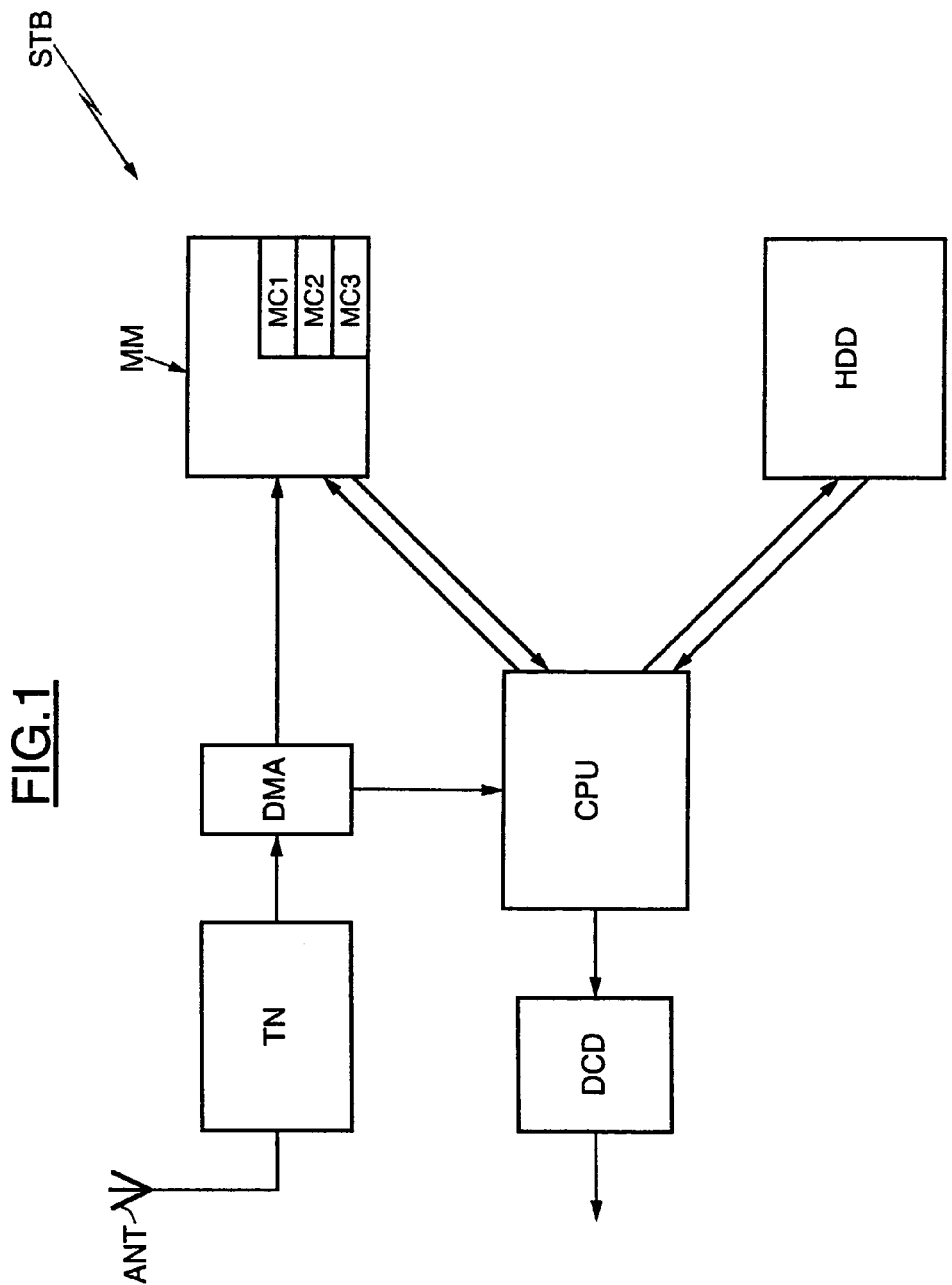
FIG. 1 diagrammatically illustrates an architecture of a device according to the present invention.

In FIG. 1, the reference STB designates a receiver of satellite digital television signals. This receiver conventionally comprises a tuner TN linked to an antenna to receive the television signals. The tuner is followed by a direct memory access block DMA which, at the rate of the interruptions, delivers audio/video data packets to a random access memory MM. A microprocessor CPU, which incorporates processing means of the invention via software, manages the random access memory MM as well as a hard disk HDD.

The microprocessor CPU delivers the audio/video streams to a decoder DCD operating according to the MPEG2 standard, for example. The output of the decoder DCD is linked to a television set. The random access memory MM comprises several cache memories MC1, MC2, MC3 capable of each storing an audio/video stream.

Figure 2:
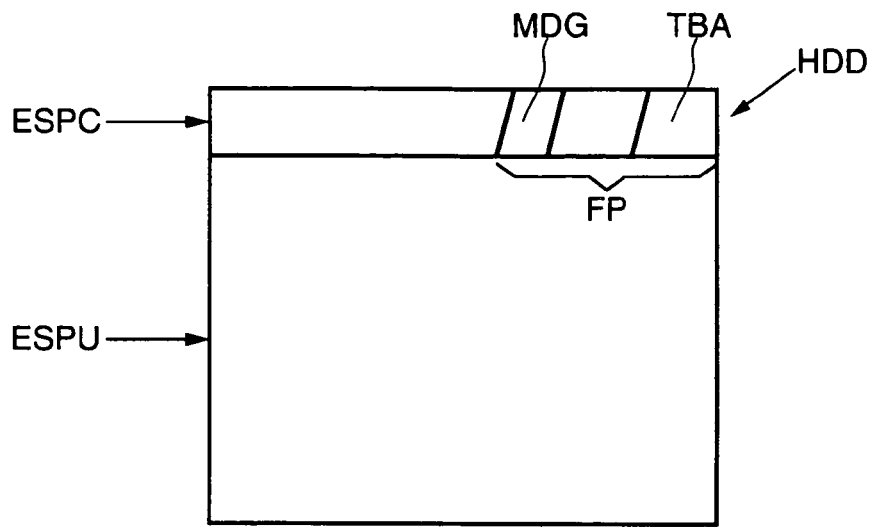
FIG. 2 diagrammatically illustrates a subdivision of the memory space of the hard disk into a control space and into a useful space according to the present invention.
Figure 3:
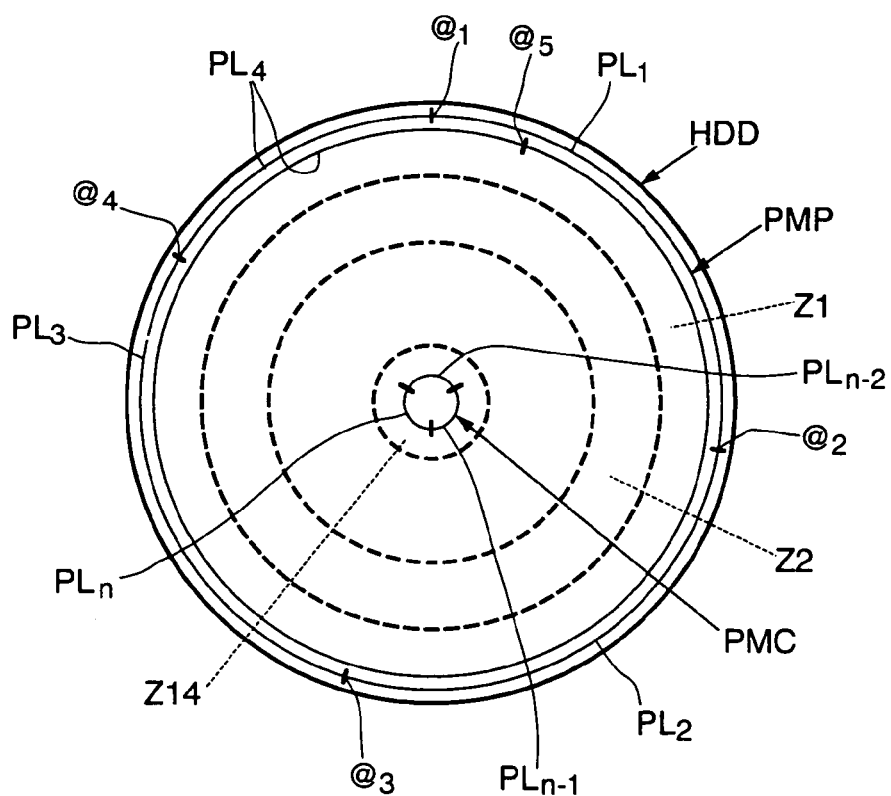
FIG. 3 diagrammatically illustrates the subdivision of the disk into logical tracks according to the present invention.

The processing means incorporated into the processor CPU comprise formatting means, embodied in software fashion, which will perform a formatting phase in which the memory space of the disk HDD, or else only a part of this memory space, is divided into a useful space ESPU (FIG. 2) and a control space ESPC. The useful space ESPU is subdivided (FIG. 3) into several adjacent areas (14 in FIG. 3) Z1-Z14 each containing several contiguous logical tracks $PL_1$ all having, in a relevant area, the same storage capacity.

Each logical track is subdivided into an integer number of elementary storage portions (or clusters), for example, into 70 elementary portions. Each cluster, having a size of 2048 bytes, for example, is an integer number of sectors of the hard disk. Each logical track possesses a start address and an end address in the memory space of the hard disk. Thus, in FIG. 3, the logical track PL1 is delimited between the addresses @1 and @2 while the logical track PL2 is defined between the addresses @2 and @3. The logical track PL3 is defined between the addresses @3 and @4 and the logical track PL4 between the addresses @4 and @5.

A logical track does not necessarily occupy the whole of a physical track PMP of the hard disk. Moreover, a logical track may extend over two portions of physical tracks of the hard disk. In particular, such is the case in FIG. 3 for the logical track PL4 which starts at the address @4, extends over a portion of the peripheral physical track PMP and continues onto the immediately adjacent physical track, terminating at the address @5.

In the central area Z14, three logical tracks $PL_{n-2}$, $PL_{n-1}$ and $PL_n$ have been represented by way of example, all extending over the central physical track PMC of the hard disk. The logical tracks have from one area to the next a variable size so as to offer a substantially constant reading and recording time over the entire hard disk.

The respective values of storage capacity of the logical tracks decrease continuously from a maximum value which corresponds to the storage capacity of the logical tracks of the area Z1 at the periphery of the disk, down to a minimum value corresponding to the storage capacity of the logical tracks of the area Z14 at the center of the disk.

The maximum value of the storage capacity of a logical track in the peripheral area is defined by the storage capacity of the cache memories $MC_1$. Also, the ratio of the minimum value to the maximum value of the storage capacities of the logical tracks corresponds to the ratio of the size of a physical track at the center of the disk to that of a physical track at the periphery of the disk.

To perform this subdivision, a phase of instrumentation of the hard disk is performed in the formatting phase, in such a way as to measure the speed of recording of the data on the disk on a peripheral track and on a central track. This gives the bit rate of recording the data on a peripheral track and on a central track. From this a ratio of these two bit rates is therefore deduced. This ratio will define the ratio of the minimum storage value of a central logical track to the maximum value of a peripheral logical track.

A number of areas is then defined. By way of indication, for a disk of 20 gigabytes, and assuming that all the memory space of the hard disk is used for an audio/video application, it will be possible to take a number of areas varying from 14 to 16. The maximum size of a peripheral logical track is then defined as a function of the storage capacity of the cache memories.

Knowing the size of such an outer logical track and the previously mentioned ratio makes it possible to deduce therefrom the size of an inner logical track. An interpolation, such as a linear interpolation, for example, between these two extreme values of the sizes of logical tracks makes it possible, given the number of areas, to define the sizes of the logical tracks of each of the areas, then the number of logical tracks per area, given the fact that in an area, the size of the logical tracks is constant.

The control space ESPC of the hard disk, which is also defined during the formatting phase, moreover contains a root cluster and a reserved space containing a so-called boot file, which are conventional and known by one skilled in the art, and a so-called persistent file FP which comprises, in particular, an allocation table TBA. This allocation table makes it possible to define the state of all the logical tracks of the hard disk. For each area, the persistent file contains the start of an area address, and the size and the number of logical tracks in the area.

The start and end addresses of each logical track can therefore be readily deduced therefrom. For each logical track, the allocation table comprises a state word which can take various values as a function of the state of the track. Thus, a completely free state, a completely free state with completely free neighboring tracks, a state of partial occupancy, and a state of total occupancy and possibly an error state are thus defined for each track.

The size of the persistent file is particularly restricted relative to the size of the memory space of the logical tracks. Thus, by way of indication, for one megabyte in the useful space ESPU of the hard disk, there is one byte in the persistent file. This restricted size of the persistent file thus makes possible, as will be seen in greater detail below, a double presence of this persistent file, both on the hard disk and in the random access memory MM.

Figure 4:
FIG. 4 diagrammatically illustrates the structure of a logical track according to the present invention.

The structure of a logical track is illustrated in FIG. 4. More precisely, this logical track PSL comprises a useful area subdivided into several adjacent elementary portions (clusters) $CL_i$, and a control area which is formed of two identical parts ZC1 and ZC2 respectively disposed at the two ends of the logical track. Each cluster $CL_i$ is tagged by its absolute index number on the hard disk (representative of its address on the hard disk).

Figure 5:
FIG. 5 diagrammatically illustrates the two indications of relationships relating to each elementary portion (cluster) of a logical track according to the present invention.
Figure 6:
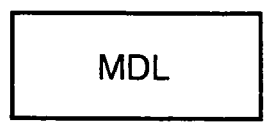
FIG. 6 diagrammatically illustrates a local dating word contained in the control area of a logical track according to the present invention.

Each part ZC1, ZC2 of the control area comprises a catalog which for each cluster $CL_i$ of the track defines its state. More precisely, this catalog comprises, as illustrated in FIG. 5, two words of 64 bits LN1 and LN2 which define a first indication of relationship and a second indication of relationship. As will be seen in greater detail below, the first indication of relationships can contain a start of file indication, or else the index number of the preceding cluster in the chain of clusters.

The second indication of relationship LN2 can contain an end of file indication or else the index number of the next cluster in the chain of relationships, or else an indication of unknown relationship (in particular, if the cluster in question is the last of the logical track), or else an indication of non-occupancy.

The control area ZC1, ZC2 furthermore also comprises a local dating word MDL, the meaning of which will be discussed in greater detail below, and which makes it possible, in combination with a global dating word MDG contained in the persistent file, and the meaning of which will also be discussed in greater detail below, to detect possible losses of supply of the device.

Reference will now be made more particularly to FIG. 7 to describe a management of the memory space of the hard disk during the reception, and the simultaneous recording of several distinct audio/video data streams. For simplification purposes, only two different audio/video streams ST1 and ST2 have been represented in FIG. 7. It should be understood that the invention allows the simultaneous recording of more than two streams, for example, 4 simultaneous recordings.

During each deployment of the device, the content of the persistent file, and consequently, the content of the allocation table TBA, is duplicated from the control space EPSC of the hard disk to the random access memory MM. During the reception of the audio/video data streams the latter are stored packet-wise in the random access memory MOS at the speed of the successive interruptions. Then, each audio/video stream, ST1, ST2 is stored on-the-fly in a cache memory MC1, MC2.

Writing means MECR embodied in software fashion within the central unit CPU, select, on the basis of the allocation table TBA contained in the random access memory MM, a completely free logical track $PL_{10}$. Although it would be possible to select a completely free logical track between two occupied logical tracks, it is preferable, in order for the head of the disk not to have to perform overly frequent jumps, to select a completely free logical track which comprises a predetermined number, for example 4 or 5, of neighboring logical tracks which are themselves completely free.

When one of the cache memories, for example, the cache memory MC1, comprises a data set the size of which corresponds to the storage capacity of the logical track selected $PL_{10}$, the content of the cache memory is stored on the logical track, that is, in the clusters CL1-CL4 of the logical track and the content of the allocation table is updated in the random access memory. The logical track $PL_{10}$ then becomes occupied.

Moreover, an updating of the local catalog contained in the areas ZC1 and ZC2 is also performed. More precisely, the first relationship indication LN1 relating to the cluster CL1 comprises the start of file indication while the second relationship indications relating to the clusters CL1-CL3 respectively comprise the index numbers of the clusters CL2-CL4. The first relationship indications relating to the clusters CL2-CL4 respectively comprise the index numbers of the clusters CL1-CL3.

The second relationship indication LN2 relating to the cluster CL4 comprises an indication of unknown relationship since at this juncture in the write process, the next logical track which will be selected with the storage of stream ST1 is not yet known because of the presence of another stream to be recorded, here in this instance the stream ST2.

It is next assumed that the cache memory MC2 has been completely filled by a part of the stream ST2. The logical track $PL_{11}$, which was the next completely free logical track, has been selected. The content of the cache memory MC2 is therefore transferred into the clusters CL5-CL8 of the logical track $PL_{11}$. The first relationship indication relating to the cluster CL5 contains the start of file indication, while the first indications of relationships of the clusters CL6-CL8 contain the index numbers of the clusters CL5-CL7. The second indications of relationships of the clusters CL5-CL7 contain the index numbers of the clusters CL6-CL8. The second indication of relationships of the cluster CL8 again comprises an indication of unknown relationship.

In the next step, it is again assumed that it is the cache memory MC2 which has been completely filled before the cache memory MC1. In this case, the content of the memory MC2 is stored in the clusters CL9-CL12 of the next logical track selected, namely the track $PL_{12}$. The updating of the local catalogs ZC1 and ZC2 of this track is performed in a similar manner to the updating of the catalogs of the track $PL_{11}$, with the difference that this time, the first relationship indication relating to the cluster CL9 contains the index number of the cluster CL8.

In the next step, this time again it is the cache memory MC1 which is full. The content is then transferred into the next logical track selected, which is the logical track $PL_{13}$. The updating of the local catalogs is performed in a manner similar to that already described. The first relationship indication relating to the cluster CL13 comprises the index number of the cluster CL4 and the second indication of relationship of the cluster CL16 still comprises an indication of unknown relationship.

The storage of the two streams continues in this way on-the-fly in tandem with the selecting of the completely free logical tracks. Of course, it is very possible that from time to time the completely free logical tracks selected may not be contiguous but separated by already occupied logical tracks. In this case, the recording head of the disk performs a jump so as to position itself on the selected logical track.

However, the person skilled in the art will nevertheless have observed that this recording of the various streams is performed in a manner which is interleaved with a displacement of the head of the disk always in the same direction, thereby avoiding to and from displacements which are detrimental to the disk recording performance. Moreover, the fact that the selecting of the logical tracks and the updating of their state is performed on the basis of the allocation table contained in the random access memory also avoids the need for the reading and recording head of the disk to position itself each time on the control space of the disk, which would also cause to and from displacements of this head.

Of course, in tandem with the storing of the various streams on the hard disk, and in tandem with the selecting of the logical tracks, a change of area may occur and the size of the logical tracks selected may decrease. In this case, the means of management of the cache memories will adapt the transfer of the content of the cache memories onto the logical tracks as a function of the current sizes of the logical tracks selected. Stated otherwise, as soon as the cache memory contains a data set whose size is equal to that of the selected track, there will be a transfer to the logical track.

Of course, when the end of the stream ST1 arrives in the cache memory MC1, this terminal part of the stream may have a size which is less than the size of the last logical track selected to receive this terminal part. In this case, this last logical track selected will not be completely filled by the content of the cache memory MC1. Also, the second indication of relationship of the last cluster of this logical track selected, which cluster is filled by audio/video data of the stream ST1 will comprise an end of file indication, while the following clusters of the logical track will have a state of non-occupancy as stated below.

The recording of the streams ST1 and ST2 on the hard disk is performed until the delivery of an end of writing signal. This end of writing signal may arrive quite naturally when all the streams have been stored, or else may occur upon action of the user of the device if the latter decides to stop the recording of the television transmissions prematurely.

The process according to the invention also provides for a chaining phase in which a chain of relationships between the various logical tracks assigned to the same stream is formulated. In the mode of implementation which is described here, each chain of relationships is effected by updating the unknown relationships. Also, this updating of the unknown relationships, which requires a scan in the other direction of all the clusters so as to replace the indications of unknown relationships by the corresponding index numbers of the clusters, is performed subsequently to this writing phase, so as not to penalize the recording bit rate.

This updating can be performed, for example, when closing the files relating to the various audio/video streams, that is, when the latter have been recorded completely on the hard disk. As a variation, this updating could be performed under time sharing with the writing of the streams on the disk if, for example, there is a relatively low bit rate of arrival of the streams relative to the possible bit rate of recording on the disk.

The process according to the invention also comprises an updating phase in which the content of the allocation table situated in the control space of the disk is updated on the basis of the allocation table contained in the random access memory. This updating can also be performed on completion of the writing on the disk of the entirety of the stream files.

Moreover, to detect any earlier occurrence of a loss of supply of the device, use is made, as indicated above, of the comparison of the content of the local dating words MDL contained in the areas ZC1 and ZC2 of the logical tracks, and of the content of the global dating word MDG. More precisely, it is recalled here that in the writing phase the persistent file has been duplicated in the random access memory. This persistent file also comprises the global dating word MDG.

Additionally, in the writing phase, the value of the global dating word MDG contained in the random access memory is incremented with each write on the disk. Also, with each write to a logical track, the content of this global dating word MDG is copied into the local dating word MDL of the control area of the relevant logical track. Therefore, when subsequently the content of the persistent file is updated on the disk on the basis of the content of the persistent file contained in the random access memory, the global dating word will have to have a value which is always greater than that of the local dating words. If such is not the case, this implies that at one moment or another, there has been a loss of supply and that the content of the global dating word in the random access memory has been set to zero.

The invention is also compatible with a slightly deferred (time shift) readout of an audio/video stream which is currently being recorded. In this case, it is sufficient that provisions be made in the random access memory for a space in which the various unknown relationships will be updated in tandem with the recording of the streams. Of course, the size of this space thus allocated in the random access memory will determine the maximum possible duration of the time shift.

Moreover, the invention is not limited to the recording of audio/video streams. It also allows the recording, according to the same process of purely computer files. The latter will also be written in an interleaved manner on logical tracks which this time will not necessarily have to be completely free.

Finally, the process according to the invention also makes it possible to record several audio/video streams simultaneously and to simultaneously read out a previously recorded audio/video stream, by using the chain of relationships linking the various clusters of this stream. Of course, in this case, to and from displacements of the recording and reading head between the area in which the various streams are simultaneously recorded and the area in which the stream already recorded is read out cannot be avoided. However, according to the invention, the displacements of the reading and writing head have been limited between two areas of the hard disk even though more than two audio/video streams are processed.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

The invention claimed is:

1. A process for managing memory space of a hard disk in a computing device comprising a random access memory receiving a plurality of audio/video data streams, the process comprising:

dividing at least a portion of the memory space into a useful space comprising contiguous logical tracks of variable size corresponding to a ratio of a size of a physical track at a center of the hard disk to a size of a physical track at a periphery of the hard disk, and into a control space comprising an allocation table corresponding to occupancy of the logical tracks;

dividing the useful space into a plurality of adjacent areas of equal storage capacity, the plurality of adjacent areas including the contiguous logical tracks; wherein respective storage capacities of the contiguous logical tracks decrease from a maximum value corresponding to the storage capacity of the logical tracks of the area at the periphery of the hard disk to a minimum value corresponding to the storage capacity of the logical tracks of the area at the center of the hard disk; and wherein a ratio of the minimum value to the maximum value corresponds to the ratio of the size of the physical track at the center of the hard disk to the size of the physical track at the periphery of the hard disk;

duplicating the allocation table in the random access memory;

recording the plurality of audio/video data streams in an interleaved fashion on free logical tracks selected based upon the allocation table duplicated in the random access memory;

formulating relationships between logical tracks assigned to a same audio/video data stream; and updating the allocation table in the control space based upon the allocation table in the random access memory.

2. A process according to claim 1, wherein the random access memory comprises a plurality of cache memories; and wherein the recording comprises:

a) selecting a free logical track based upon the allocation table in the random access memory;

b) respectively storing the plurality of audio/video data streams on-the-fly in different cache memories at a rate of one cache memory per audio/video data stream;

c) storing contents of a respective cache memory on the selected logical track when the respective cache memory comprises a data set having a size corresponding to the storage capacity of the selected logical track, and updating the allocation table in the random access memory;

d) selecting a next free logical track which follows a previously selected logical track based upon the allocation table; and e) repeating steps b) to d) until an end of writing signal is received, and allocating a final logical track to an audio/video data stream that is only partially written.

3. A process according to claim 2, wherein each logical track comprises a useful area—divided into a plurality of adjacent elementary portions and a control area, the control area comprising for each elementary portion a first indication of relationship and a second indication of relationship.

4. A process according to claim 3, wherein formulating the relationships further comprises, during storage of a data set on a selected logical track, the following:

updating the first indication of relationship of each elementary portion of the selected logical track with at least one of a start of file indication and an index number of a preceding elementary portion;

updating the second indication of relationship of each elementary portion of the selected logical track, except for a last elementary portion, with at least one of an index number of a next elementary portion, an end of file indication, and a non-occupancy indication; and updating the second indication of relationship of the last elementary portion of the selected logical track with at least one of an end of file indication, an indication of unknown relationship, and an indication of non-occupancy.

5. A process according to claim 4, wherein formulating the relationships further comprises updating unknown relationships.

6. A process according to claim 5, wherein updating the unknown relationships relating to files containing the plurality of audio/video data streams is performed after completion of writing the entire files on the hard disk.

7. A process according to claim 5, wherein updating the unknown relationships relating to files containing the plurality of audio/video data streams is performed based upon time sharing with the recording of the audio/video streams on the hard disk.

8. A process according to claim 3, wherein each control area comprises two identical parts, with each part at a respective end of the logical track.

9. A process according to claim 3, wherein the control space comprises a global dating word and the control area of each logical track comprises a local dating word; and further comprising copying the global dating word into the random access memory when duplicating the allocation table therein.

10. A process according to claim 9, wherein during the recording of the plurality of audio/video data streams a value of the global dating word in the random access memory is incremented with each write on the hard disk; and with each write to a logical track the global dating word is copied into the local dating word of the control area of a relevant logical track; and a comparison of the global dating word with the local dating word yields an indication regarding an earlier occurrence of a loss of supply of the computing device.

11. A process according to claim 2, wherein step a) further comprises selecting a free logical track at a start of a succession of a predetermined number of free contiguous logical tracks.

12. A process according to claim 1, wherein the updating is performed upon completion of recording the plurality of audio/video data streams.

13. A computing device comprising:

a random access memory for receiving a plurality of audio/video data streams;

a hard disk; and processing means connected to said random access memory, and to said hard drive for managing memory space thereof, said processing means comprising formatting means for dividing at least a portion of the memory space into a useful space comprising contiguous logical tracks of variable size corresponding to a ratio of a size of a physical track at a center of said hard disk to a size of a physical track at a periphery of said hard disk, and into a control space comprising an allocation table corresponding to occupancy of the logical tracks, formatting means for further dividing the useful space into a plurality of adjacent areas of equal storage capacity, the plurality of adjacent areas including the contiguous logical tracks; wherein respective storage capacities of the contiguous logical tracks decrease from a maximum value corresponding to the storage capacity of the logical tracks of the area at the periphery of said hard disk to a minimum value corresponding to the storage capacity of the logical tracks of the area at the center of said hard disk; and wherein a ratio of the minimum value to the maximum value corresponds to the ratio of the size of the physical track at the center of the hard disk to the size of the physical track at the periphery of the hard disk, duplicating means for duplicating the allocation table in the random access memory, writing means for recording the plurality of audio/video data streams in an interleaved fashion on free logical tracks selected based upon the allocation table duplicated in the random access memory, chaining means for formulating relationships between logical tracks assigned to a same audio/video data stream, and updating means for updating the allocation table in the control space based upon the allocation table in the random access memory.

14. A computing device according to claim 13, wherein said random access memory comprises a plurality of cache memories; and wherein said writing means comprises a set of instructions for:

a) selecting a free logical track based upon the allocation table in said random access memory;

b) respectively storing the plurality of audio/video data streams on-the-fly in different cache memories at a rate of one cache memory per audio/video data stream;

c) storing contents of a respective cache memory on the selected logical track when the respective cache memory comprises a data set having a size corresponding to the storage capacity of the selected logical track, and updating the allocation table in said random access memory;

d) selecting a next free logical track which follows a previously selected logical track based upon the allocation table; and e) repeating steps b) to d) until an end of writing signal is received, and allocating a final logical track to an audio/video data stream that is only partially written.

15. A computing device according to claim 14, wherein each logical track comprises a useful area divided into a plurality of adjacent elementary portions and a control area, the control area comprising for each elementary portion a first indication of relationship and a second indication of relationship.

16. A computing device according to claim 15, wherein said formulating means further comprises, during storage of a data set on a selected logical track, the following:
   updating the first indication of relationship of each elementary portion of the selected logical track with at least one of a start of file indication and an index number of a preceding elementary portion;
   updating the second indication of relationship of each elementary portion of the selected logical track, except for a last elementary portion, with at least one of an index number of a next elementary portion, an end of file indication, and a non-occupancy indication; and
   updating the second indication of relationship of the last elementary portion of the selected logical track with at least one of an end of file indication, an indication of unknown relationship, and an indication of non-occupancy.

17. A computing device according to claim 16, wherein said formulating means further comprises updating unknown relationships.

18. A computing device according to claim 17, wherein updating the unknown relationships relating to files containing the plurality of audio/video data streams is performed after completion of writing the entire files on said hard disk.

19. A computing device according to claim 17, wherein updating the unknown relationships relating to files containing the plurality of audio/video data streams is performed based upon time sharing with the recording of the audio/video streams on said hard disk.

20. A computing device according to claim 15, wherein the control space comprises a global dating word and the control area of each logical track comprises a local dating word; and further comprising copying the global dating word into the random access memory when duplicating the allocation table therein.

21. A computing device according to claim 20, wherein during the recording of the plurality of audio/video data streams a value of the global dating word in the random access memory is incremented with each write on the hard disk; and with each write to a logical track the global dating word is copied into the local dating word of the control area of a relevant logical track; and a comparison of the global dating word with the local dating word yields an indication regarding an earlier occurrence of a loss of supply of the computing device.

22. A computing device comprising:
   a random access memory for receiving a plurality of audio/video data streams;
   a hard disk; and
   a processor connected to said random access memory, and to said hard drive for managing memory space thereof, said processor for performing the following
      dividing at least a portion of the memory space into a useful space comprising contiguous logical tracks of variable size corresponding to a predetermined ratio, and into a control space comprising an allocation table corresponding to occupancy of the logical tracks,
      dividing the useful space into a plurality of adjacent areas of equal storage capacity, the plurality of adjacent areas including the contiguous logical tracks; wherein respective storage capacities of the contiguous logical tracks decrease from a maximum value corresponding to the storage capacity of the logical tracks of the area at the periphery of the disk to a minimum value corresponding to the storage capacity of the logical tracks of the area at the center of the hard disk; and wherein a ratio of the minimum value to the maximum value corresponds to the predetermined,
      duplicating the allocation table in the random access memory,
      recording the plurality of audio/video data streams in an interleaved fashion on free logical tracks selected based upon the allocation table duplicated in the random access memory,
      formulating relationships between logical tracks assigned to a same audio/video data stream, and
      updating the allocation table in the control space based upon the allocation table in the random access memory.

23. A computing device according to claim 22, wherein the predetermined ratio is equal to a size of a physical track at a center of said hard disk to a size of a physical track at a periphery of said hard disk.

24. A computing device according to claim 22, wherein the predetermined ratio is equal to a size of a physical track at a center of said hard disk to a size of a physical track at a periphery of said hard disk.

25. A computing device according to claim 22, wherein said random access memory comprises a plurality of cache memories; and wherein the recording comprises:
   a) selecting a free logical track based upon the allocation table in said random access memory;
   b) respectively storing the plurality of audio/video data streams on-the-fly in different cache memories at a rate of one cache memory per audio/video data stream;
   c) storing contents of a respective cache memory on the selected logical track when the respective cache memory comprises a data set having a size corresponding to the storage capacity of the selected logical track, and updating the allocation table in said random access memory;
   d) selecting a next free logical track which follows a previously selected logical track based upon the allocation table; and
   e) repeating steps b) to d) until an end of writing signal is received, and allocating a final logical track to an audio/video data stream that is only partially written.

26. A computing device according to claim 25, wherein each logical track comprises a useful area divided into a plurality of adjacent elementary portions and a control area, the control area comprising for each elementary portion a first indication of relationship and a second indication of relationship.

27. A computing device according to claim 25, wherein formulating the relationships comprises, during storage of a data set on a selected logical track, the following:
   updating the first indication of relationship of each elementary portion of the selected logical track with at least one of a start of file indication and an index number of a preceding elementary portion;
   updating the second indication of relationship of each elementary portion of the selected logical track, except for a last elementary portion, with at least one of an index number of a next elementary portion, an end of file indication, and a non-occupancy indication; and
   updating the second indication of relationship of the last elementary portion of the selected logical track with at least one of an end of file indication, an indication of unknown relationship, and an indication of non-occupancy.

28. A digital television satellite receiver comprising:
a tuner;
a random access memory connected to said tuner for receiving a plurality of audio/video data streams therefrom;
a hard disk; and
a processor connected to said random access memory, and to said hard drive for managing memory space thereof, said processor for performing the following
dividing at least a portion of the memory space into a useful space comprising contiguous logical tracks of variable size corresponding to a ratio of a size of a physical track at a center of said hard disk to a size of a physical track at a periphery of said hard disk, and into a control space comprising an allocation table corresponding to occupancy of the logical tracks,
dividing the useful space into a plurality of adjacent areas of equal storage capacity, the plurality of adjacent areas including the logical tracks; wherein respective storage capacities of the logical tracks decrease from a maximum value corresponding to the storage capacity of the logical tracks of the area at the periphery of the disk to a minimum value corresponding to the storage capacity of the logical tracks of the area at the center of the hard disk; and wherein a ratio of the minimum value to the maximum value corresponds to the ratio of the size of the physical track at the center of the disk to the size of the physical track at the periphery of the disk.
duplicating the allocation table in the random access memory,
recording the plurality of audio/video data streams in an interleaved fashion on logical tracks selected based upon the allocation table duplicated in the random access memory,
formulating relationships between logical tracks assigned to a same audio/video data stream, and
updating the allocation table in the control space based upon the allocation table in the random access memory.

29. A digital television satellite receiver according to claim 28, wherein said random access memory comprises a plurality of cache memories; and wherein the recording further comprises:
a) selecting a logical track based upon the allocation table in said random access memory;
b) respectively storing the plurality of audio/video data streams on-the-fly in different cache memories at a rate of one cache memory per audio/video data stream;
c) storing contents of a respective cache memory on the selected logical track when the respective cache memory comprises a data set having a size corresponding to the storage capacity of the selected logical track, and updating the allocation table in said random access memory;
d) selecting a next free logical track which follows a previously selected logical track based upon the allocation table; and
e) repeating steps b) to d) until an end of writing signal is received, and allocating a final logical track to an audio/video data stream that is only partially written.

30. A digital television satellite receiver according to claim 29, wherein each logical track comprises a useful area divided into a plurality of adjacent elementary portions and a control area, the control area comprising for each elementary portion a first indication of relationship and a second indication of relationship.

31. A digital television satellite receiver according to claim 30, wherein formulating the relationships further comprises, during storage of a data set on a selected logical track, the following:
updating the first indication of relationship of each elementary portion of the selected logical track with at least one of a start of file indication and an index number of a preceding elementary portion;
updating the second indication of relationship of each elementary portion of the selected logical track, except for a last elementary portion, with at least one of an index number of a next elementary portion, an end of file indication, and a non-occupancy indication; and
updating the second indication of relationship of the last elementary portion of the selected logical track with at least one of an end of file indication, an indication of unknown relationship, and an indication of non-occupancy.

32. A digital television satellite receiver according to claim 31, wherein said formulating the relationships module further comprises updating unknown relationships.

33. A digital television satellite receiver according to claim 32, wherein updating the unknown relationships relating to files containing the plurality of audio/video data streams is performed after completion of at least one of writing the entire files on said hard disk.

34. A digital television satellite receiver according to claim 32, wherein updating the unknown relationships relating to files containing the plurality of audio/video data streams is performed based upon time sharing with the recording of the audio/video streams on said hard disk.

* * * * *

UNITED STATES PATENT AND TRADEMARK OFFICE
CERTIFICATE OF CORRECTION

PATENT NO. : 7,280,745 B2
APPLICATION NO. : 10/172356
DATED : October 9, 2007
INVENTOR(S) : Mollie et al.

It is certified that error appears in the above-identified patent and that said Letters Patent is hereby corrected as shown below:

Column 7, Line 15   Delete: "$PL_1$"
                    Insert: -- $PL_i$ --

Column 7, Line 50   Delete: "$MC_1$"
                    Insert: -- $MC_i$ --

Signed and Sealed this

Thirteenth Day of May, 2008

JON W. DUDAS
*Director of the United States Patent and Trademark Office*